(12) United States Patent
Tsai et al.

(10) Patent No.: US 10,710,287 B2
(45) Date of Patent: Jul. 14, 2020

(54) INJECTION MOLDING METHOD AND MOLD MECHANISM

(71) Applicant: TAIWAN GREEN POINT ENTERPRISES CO., LTD., Taichung (TW)

(72) Inventors: Ray-Long Tsai, Taichung (TW); Chi-Hung Liao, Taichung (TW); Yan-Hua Li, Taichung (TW); Chien-Jung Hsu, Taichung (TW); Chun-Hao Hu, Taichung (TW); Chia-Yu Yen, Taichung (TW)

(73) Assignee: Taiwan Green Point Enterprises Co., Ltd., Taichung (TW)

( * ) Notice: Subject to any disclaimer, the term of this patent is extended or adjusted under 35 U.S.C. 154(b) by 373 days.

(21) Appl. No.: 15/880,950

(22) Filed: Jan. 26, 2018

(65) Prior Publication Data

US 2018/0147760 A1 May 31, 2018

Related U.S. Application Data

(62) Division of application No. 14/885,519, filed on Oct. 16, 2015, now abandoned.

(30) Foreign Application Priority Data

Oct. 17, 2014 (TW) .............................. 103136025 A

(51) Int. Cl.
*B29C 45/14* (2006.01)
*B29C 45/26* (2006.01)

(52) U.S. Cl.
CPC .... *B29C 45/14073* (2013.01); *B29C 45/2602* (2013.01)

(58) Field of Classification Search
CPC .......... B29C 45/14073; B29C 45/2602; B29C 45/4421; B29C 45/14065; B29C 45/26; B29C 33/48; B29C 33/485
See application file for complete search history.

(56) References Cited

U.S. PATENT DOCUMENTS 3,060,509 A * 10/1962 McCubbins, Jr. .. B29C 45/2628
425/577
3,068,522 A  12/1962 Nickerson et al.
(Continued)

FOREIGN PATENT DOCUMENTS

GB  1382583 A  2/1975
JP  48-48553 A  7/1973

*Primary Examiner* — Xiao S Zhao
*Assistant Examiner* — Emmanuel S Luk
(74) *Attorney, Agent, or Firm* — Young Basile Hanlon & MacFarlane, P.C.

(57) ABSTRACT

An injection molding method includes the steps of positioning a core piece in a mold cavity through a plurality of positioning pins; injecting a molten plastic material into the mold cavity to surround and cover the core piece; maintaining the pressure inside the mold cavity at a predetermined maintaining time so that the core piece is positioned by the molten plastic material; retracting the positioning pins from the mold cavity when a predetermined retraction time is reached, so that spaces occupied by the positioning pins in the mold cavity can be filled with the molten plastic material; and completely curing the molten plastic material to form a finished product.

13 Claims, 17 Drawing Sheets

(56) References Cited

U.S. PATENT DOCUMENTS

| | | | |
|---|---|---|---|
| 3,642,417 A * | 2/1972 | Von Holdt | B29C 33/442 425/443 |
| 3,854,691 A * | 12/1974 | Humphrey | B29C 45/14065 249/91 |
| 3,905,740 A * | 9/1975 | Lovejoy | B29C 45/33 425/438 |
| 4,021,180 A * | 5/1977 | Smith | B29C 57/04 425/392 |
| 4,470,786 A * | 9/1984 | Sano | B29C 33/14 257/E21.504 |
| 5,219,594 A * | 6/1993 | Meyer | B29C 45/4435 249/180 |
| 5,281,127 A * | 1/1994 | Ramsey | B29C 45/4435 249/180 |
| 5,403,179 A * | 4/1995 | Ramsey | B29C 45/4421 264/318 |
| 5,551,864 A * | 9/1996 | Boskovic | B29C 45/4435 425/556 |
| 5,773,048 A * | 6/1998 | Ramsey | B29C 45/4435 425/556 |
| 5,814,357 A * | 9/1998 | Boskovic | B29C 45/4435 264/318 |
| 6,033,611 A | 3/2000 | Yamaguchi | |
| 6,039,558 A * | 3/2000 | Park | B29C 45/4435 425/556 |
| 6,235,231 B1 * | 5/2001 | Martin | B29C 45/2628 264/328.1 |
| 6,319,451 B1 | 11/2001 | Brune | |
| 6,379,138 B1 * | 4/2002 | Puniello | B29C 45/14073 425/116 |
| 6,491,513 B1 * | 12/2002 | Schneider | B29C 45/4435 425/438 |
| 6,537,053 B1 * | 3/2003 | Watkins | B29C 43/42 249/68 |
| 6,655,952 B1 * | 12/2003 | Kraft | B29C 45/4435 264/318 |
| 6,749,420 B2 * | 6/2004 | Navarra Pruna | B29C 45/401 425/556 |
| 7,261,853 B2 * | 8/2007 | Sutter | B29C 45/40 249/68 |
| 7,293,341 B2 * | 11/2007 | Zydron | B29C 45/4421 29/450 |
| 7,309,227 B2 * | 12/2007 | Pierson | B29C 45/44 425/441 |
| 7,387,505 B1 * | 6/2008 | Chen | B29C 45/332 425/190 |
| 7,435,079 B2 * | 10/2008 | Wang | B29C 45/44 425/577 |
| 7,476,354 B2 * | 1/2009 | Clack | B29C 49/20 264/516 |
| 8,002,538 B2 * | 8/2011 | Zydron | B29C 45/4421 425/417 |
| 8,029,267 B2 * | 10/2011 | Takao | B29C 45/4435 425/444 |
| 8,226,404 B2 * | 7/2012 | Sorimoto | B22D 17/2236 425/438 |
| 8,241,031 B2 * | 8/2012 | Starkey | B29C 45/4435 264/318 |
| 8,469,696 B2 * | 6/2013 | Navarra Pruna | B29C 45/4435 425/556 |
| 8,475,156 B2 * | 7/2013 | Gong | B29C 45/4435 425/438 |
| 9,011,138 B2 * | 4/2015 | Hickok | B29C 45/4421 425/443 |
| 9,808,975 B2 * | 11/2017 | Chappel | B29C 45/4421 |
| 2002/0086074 A1 | 7/2002 | Lavallee | |
| 2004/0109913 A1 * | 6/2004 | Drees | B29C 33/306 425/556 |
| 2004/0222555 A1 | 11/2004 | Puniello et al. | |
| 2007/0148281 A1 * | 6/2007 | Tu | B29C 45/332 425/589 |
| 2008/0308710 A1 * | 12/2008 | Yu | B29C 45/2602 249/68 |
| 2011/0262583 A1 * | 10/2011 | Lin | B29C 45/332 425/556 |
| 2012/0183641 A1 * | 7/2012 | Shih | B29C 45/401 425/577 |
| 2013/0004608 A1 * | 1/2013 | Yeh | B29C 45/14065 425/129.1 |
| 2018/0361640 A1 * | 12/2018 | Yi | B29C 45/261 |

* cited by examiner

INJECTION MOLDING METHOD AND MOLD MECHANISM

CROSS REFERENCE TO RELATED APPLICATIONS

This application is a divisional of U.S. patent application Ser. No. 14/885,519, filed Oct. 16, 2015, which claims priority to Taiwanese Patent Application No. 103136025, filed on Oct. 17, 2014, all of which are hereby incorporated by reference as if fully set forth.

FIELD

Embodiments of the present disclosure generally relate to a molding method and a mold mechanism, and more particularly to an injection molding method and an injection mold mechanism.

BACKGROUND

U.S. Pat. No. 6,319,451 discloses an injection molding method which comprises the steps of: supporting and positioning a core piece in a mold cavity by virtue of a plurality of positioning pins, injecting a molding material through a gate, retracting the positioning pins before the molding material contacts the positioning pins, and opening the mold and ejecting out a finished product after the molding material is cured and cooled.

Further, U.S. Pat. No. 6,033,611 discloses an injection molding method which comprises the steps of: supporting and positioning a core piece in a mold cavity by virtue of a plurality of positioning pins, injecting a first material through a gate, retracting partially the positioning pins before the first material contacts the positioning pins, curing the first material while the positioning pins are retracted to form an inner cover having a plurality of recesses which correspond to spaces occupied by the positioning pins in the mold cavity, injecting a second material through the gate so as to fill up the recesses and surroundingly cover the first material, and opening the mold after the second material is cured and cooled to remove a finished product having a double-layered structure.

However, because the positioning pins are retracted before the mold cavity is filled with the material, the core piece may be offset slightly, resulting in a reduction of positioning accuracy of the core piece. Therefore, there is still room for improvement.

SUMMARY

In certain embodiments of the disclosure, an injection molding method may be provided. The injection molding method may include the steps of: positioning a core piece in a mold cavity through a plurality of positioning pins; injecting a molten plastic material into the mold cavity to surround and cover the core piece; maintaining the pressure inside the mold cavity at a predetermined maintaining time so that the core piece is positioned by the molten plastic material; retracting the positioning pins from the mold cavity when a predetermined retraction time is reached, so that spaces occupied by the positioning pins in the mold cavity can be filled with the molten plastic material, the predetermined retraction time being the time before the predetermined maintaining time is reached and before the molten plastic material is completely cured; and completely curing the molten plastic material to form a finished product.

In certain embodiments of the disclosure, an injection mold mechanism may be provided. The injection mold mechanism may include: a male mold including a base plate, and an embedding portion disposed on the base plate and formed with an embedding groove; a pushing system including a push rod that is actuatable to move through the male mold along a pushing direction; and a male mold core disposed in the embedding groove. The male mold core includes a forming member having a first mold cavity, and a positioning module including a plurality of positioning pin units each of which has a slide member, at least one positioning pin fixed on the slide member, and a drive member to drive movement of the slide member. Prior to actuation of the push rod, the slide members of the positioning pin units are spaced apart from each other and the positioning pins of the positioning pin units extend into the first mold cavity. When the push rod is actuated, the push rod pushes the drive members of the positioning pin units to respectively engage the slide members and drive the slide members to move toward each other to thereby retract the positioning pins from the first mold cavity.

In certain embodiments of the disclosure, an injection mold mechanism may be provided. The injection mold mechanism may include: a male mold core including a forming member having a first mold cavity, and a positioning module including a plurality of inner positioning pin units each of which has an inner slide member, at least one inner positioning pin fixed on the inner slide member, and an inner drive member to drive movement of the inner slide member; a male mold including a base plate, and an embedding portion disposed on the base plate, and a plurality of outer positioning pin units, the embedding portion being formed with an embedding groove in a surface that is opposite to an interface between the embedding portion and the base plate for receiving the male mold core, each of the outer positioning pin units having an outer slide member with a through hole, an outer positioning pin fixed on the outer slide member, and an outer drive member to drive movement of the outer slide member, the outer drive member having an outer abutment portion and an inclined insert portion that is inclined with respect to the outer abutment portion and that is movable into the through hole in the outer slide member; and a pushing system including an inner push rod that is actuatable to move through the male mold along a pushing direction, a first push plate connected to the push rod, a plurality of springs that are disposed on the first push plate and that extend toward the male mold core, a second push plate that is connected to the springs opposite to the first push plate and that is parallel to the first push plate, and a plurality of outer push rods that are connected to the second push plate and that extend through the male mold, the inner push rod abutting against the inner drive member, each of the outer push rods abutting against the outer drive member of a respective one of the outer positioning pin units. Prior to actuation of the inner and outer push rods, the inner slide members of the inner positioning pin units are spaced apart from each other, the outer slide members of the outer positioning pin units are also spaced apart from each other, and the inner positioning pins of the inner positioning pin units and the outer positioning pins of the outer positioning pin units extend into the first mold cavity. When the inner push rods are actuated, the inner push rod pushes the inner drive members of the inner positioning pin units to respectively engage the inner slide members and drive the inner slide members to move toward each other to thereby retract the inner positioning pins from the first mold cavity. When the outer push rods are actuated, the outer push rod pushes the outer drive members of the outer positioning pin units to respectively engage the outer slide members and drive the outer slide members to move toward each other to thereby retract the outer positioning pins from the first mold cavity.

BRIEF DESCRIPTION OF THE DRAWINGS

Other features and advantages of the disclosure will become apparent in the following detailed description of the exemplary embodiments with reference to the accompanying drawings, of which.

DETAILED DESCRIPTION OF THE EXEMPLARY EMBODIMENTS

Figure 1:
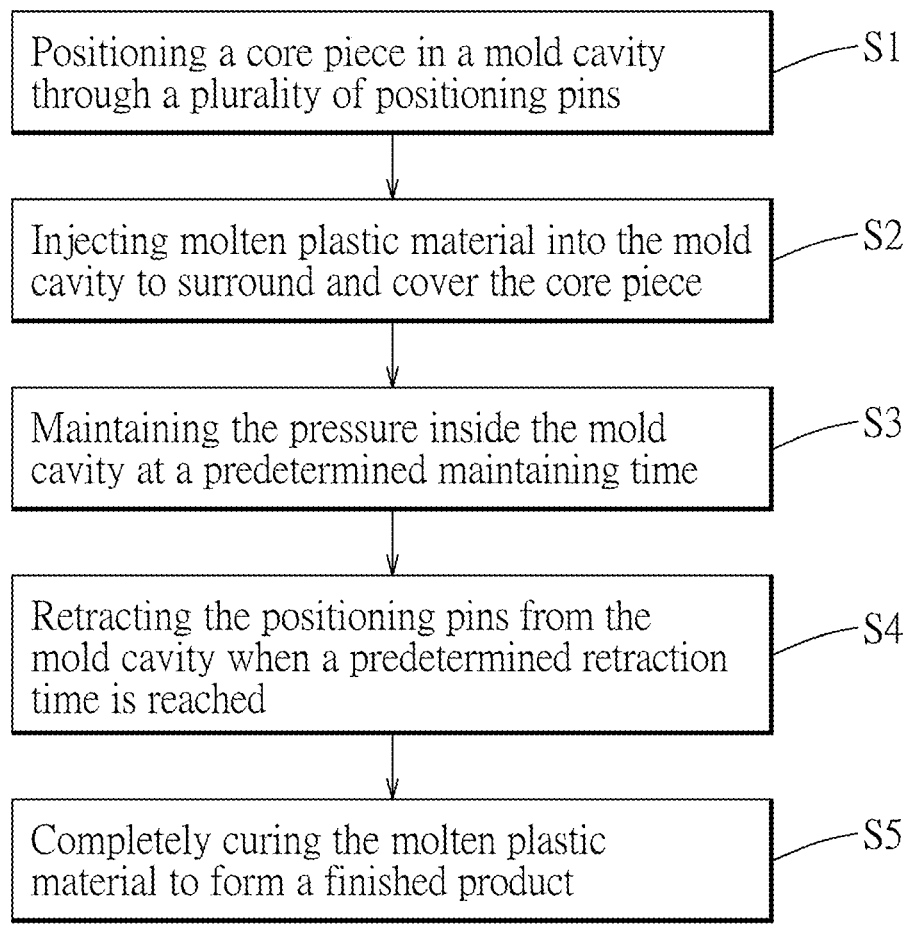
FIG. 1 is a flow chart, illustrating the steps involved in an injection molding method according to an embodiment of the disclosure.
Figure 2:
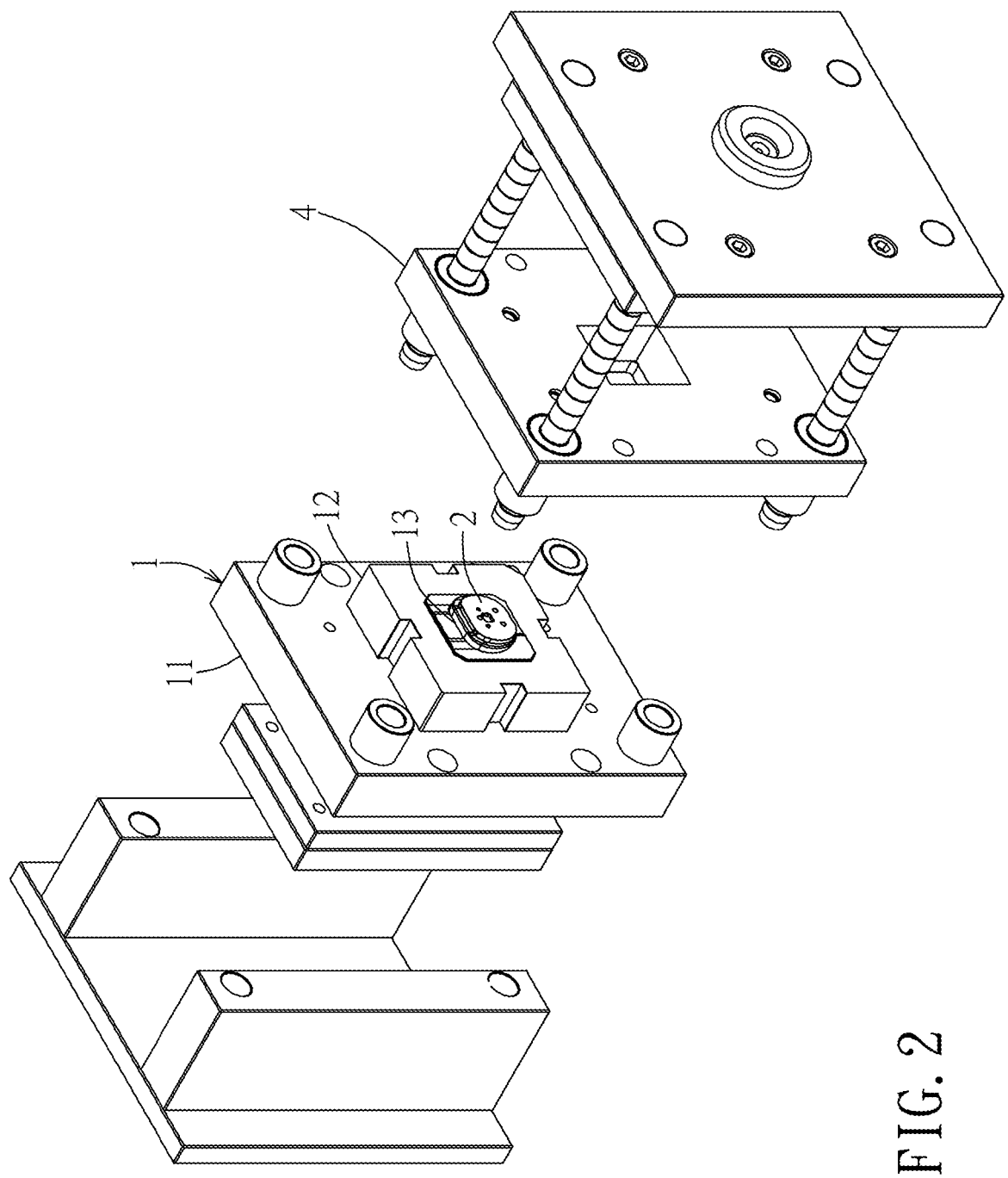
FIG. 2 is an exploded perspective view of a first embodiment of an injection mold mechanism of the disclosure.

It may be noted herein that like elements are denoted by the same reference numerals throughout the disclosure.

With reference to FIG. 1, in combination with FIGS. 2 to 18, an embodiment of an injection molding method of the disclosure comprises steps S1 to S5.

In step S1, a core piece 6 is positioned in a mold cavity 53 defined by male and female molds 1, 4 through a plurality of positioning pins 223. That is, the core piece 6 is fixedly positioned in the mold cavity 53 by means of the positioning pins 223 and is spaced apart from a mold cavity wall of the mold cavity 53 by a predetermined distance.

In step S2, a molten plastic material is injected into the mold cavity 53 to surround and cover the core piece 6. The molten plastic material may flow in a space between the core piece 6 and the mold cavity wall of the mold cavity 53 so as to surround and cover the core piece 6. In this embodiment, the time for injecting and filling the mold cavity 53 with the molten plastic material is 1 second, and about 98% of the mold cavity space is filled with the molten plastic material.

In step S3, the pressure inside the mold cavity 53 is maintained at a predetermined maintaining time so that the molten plastic material can be slightly solidified to prevent movement or shifting of the core piece 6 in the mold cavity 53. As such, the core piece 6 can be surrounded, covered and positioned by the molten plastic material. In this embodiment, the predetermined maintaining time is 5 seconds.

During the injection process of the molten plastic material, the molten plastic material starts to cool and solidify as it enters the mold cavity 53, and with an isotropic filling pressure inside the mold cavity 53 acting on the core piece 6 after the molten plastic material fills the mold cavity 53 while the positioning pins 223 support the core piece 6, the core piece 6 is surrounded and fixed by the molten plastic material without offsetting, thereby achieving a surrounding and positioning effect of the core piece 6 at this stage.

In step S4, the positioning pins 223 are retracted from the mold cavity 53 when a predetermined retraction time is reached, so that spaces occupied by the positioning pins 223 in the mold cavity 53 can be filled with the molten plastic material. The pre-determined retraction time is the time before the predetermined maintaining time is reached and before the molten plastic material is completely cured. In this embodiment, the predetermined retraction time is 0.5 seconds. Since the core piece 6 has been surrounded and positioned by the molten plastic material, the relative position of the core piece 6 in the molten plastic material may not be affected after the positioning pins 223 are retracted. In addition, since the molten plastic material has not been completely cured, and since the spaces occupied by the positioning pins 223 are small and easily closed by the molten plastic material, there will be no pin holes resulting from retraction of the positioning pins 223.

After retraction, the minor spaces of the positioning pins 223 in the mold cavity 53 will be filled with the molten plastic material and the molten plastic material is cured continuously. If the retraction time of the positioning pins 223 is too late, the spaces occupied by the positioning pins 223 after retraction may not be filled with the molten plastic material.

Figure 18:
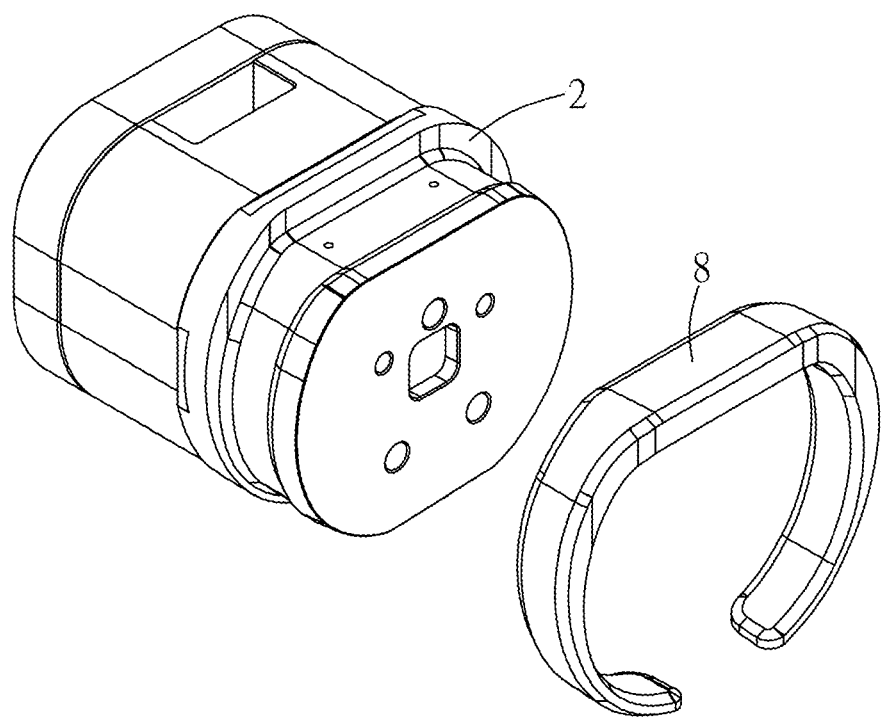
FIG. 18 is a view similar to FIG. 17, but with the finished product removed from the male mold core.

In step S5, the molten plastic material is completely cured to form a finished product 8 (see FIG. 18). The finished product 8 has a configuration in which the core piece 6 is wrapped by a plastic outer layer, and the plastic outer layer has no pin holes. Therefore, the finished product 8 has an aesthetic appearance and a good structural strength. The core piece 6 is provided for enhancing the overall structural strength of the finished product 8.

Referring to FIGS. 2 to 7, a first embodiment of an injection mold mechanism of the disclosure comprises a male mold 1, a pushing system 3, a male mold core 2, a female mold 4, a female mold core 5, and a runner system 7.

The male mold 1 includes a base plate 11, and an embedding portion 12 disposed on the base plate 11. The embedding portion 12 is formed with an embedding groove 13 in a surface that is opposite to an interface between the embedding portion 12 and the base plate 11.

Figure 6:
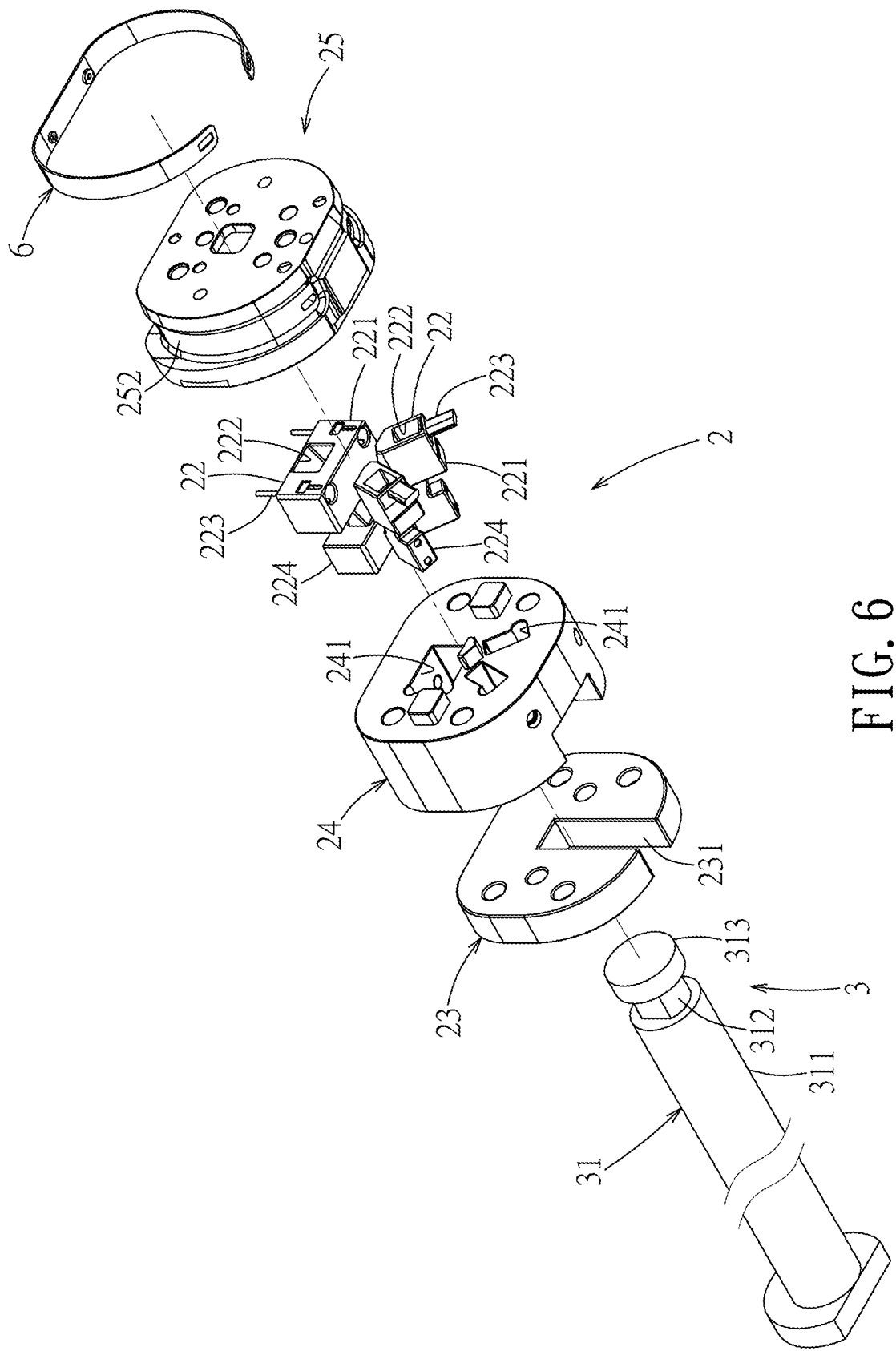
FIG. 6 is an exploded perspective view of a male mold, a core piece and a push rod of the first embodiment.
Figure 7:
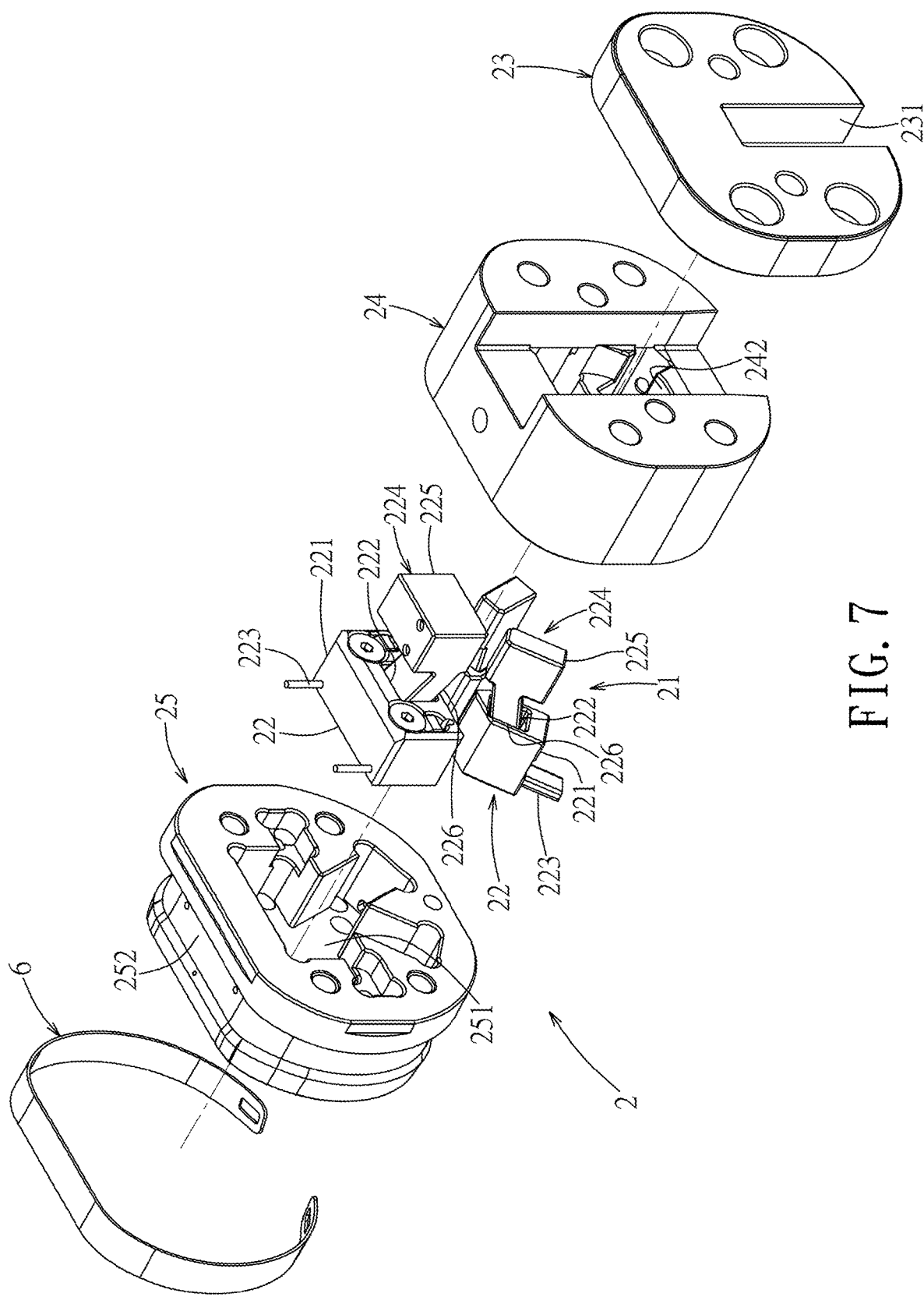
FIG. 7 is an exploded perspective view of the male mold and the core piece.

With reference to FIGS. 6 and 7, the male mold core 2 is disposed in the embedding groove 13, and includes a positioning module 21, a connecting member 23, a holding member 24 and a forming member 25. In this embodiment, the positioning module 21 includes three inner positioning pin units 22. Each of the positioning pin units 22 has an inner slide member 221 with a through hole 222, at least one inner positioning pin 223 fixed on the slide member 221, and an inner drive member 224 to drive movement of the slide member 221. The drive member 224 has an abutment portion 225, and an inclined insert portions 226 that is inclined with respect to the abutment portion 225 and that is movable into the through hole 222. One of the positioning pin units 22 has two positioning pins 223, and the slide member 221 thereof is larger than those of the other two positioning pin units 22. Each of the other two positioning pin units 22 has one positioning pin 223. The connecting member 23 has an engaging groove 231. The holding member 24 is sandwiched between the forming member 25 and the connecting member 23, and has three first receiving holes 241 respectively receiving the drive members 224 of the positioning pin units 22, and a second receiving hole 242 communicating with the first receiving holes 241. The forming member 25 has a first mold cavity 252 formed on an outer periphery thereof, and a plurality of slide grooves 251 respectively receiving the slide members 221 of the positioning pin units 22.

Figure 3:
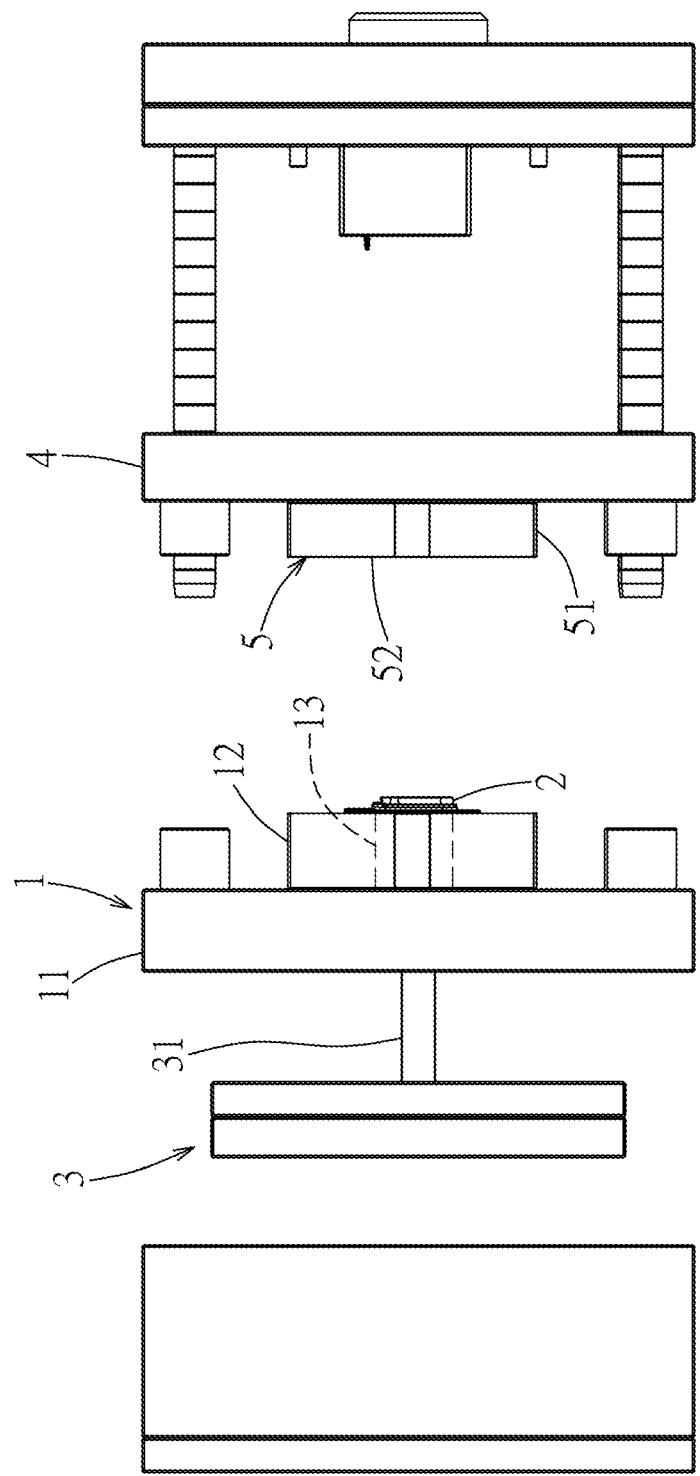
FIG. 3 is an exploded top view of the first embodiment.

The pushing system 3 includes an inner push rod 31 that is actuatable to move through the male mold 1 along a pushing direction, as illustrated in FIG. 3, and a pushing device (not shown) connected to the push rod 31. The push rod 31 has a main body 311, a neck portion 312 connected to the main body 311, and a pushing portion 313 connected to the neck portion 312 opposite to the main body 311. The engaging groove 231 of the connecting member 23 has an inverted U-shaped cross section with an opening that opens downward. The neck portion 312 has a cross-sectional area smaller than that of the main body 311 and that of the pushing portion 313, and is inserted movably into the engaging groove 231 through the opening. The pushing portion 313 extends into the second receiving hole 242 of the holding member 24 and has a shape matching that of the second receiving hole 242. The pushing device is provided for controlling the moving speed and time of the push rod 31. In this embodiment, the pushing device is a servo motor that can precisely control the speed, position and timing for pushing the push rod 31.

Figure 8:
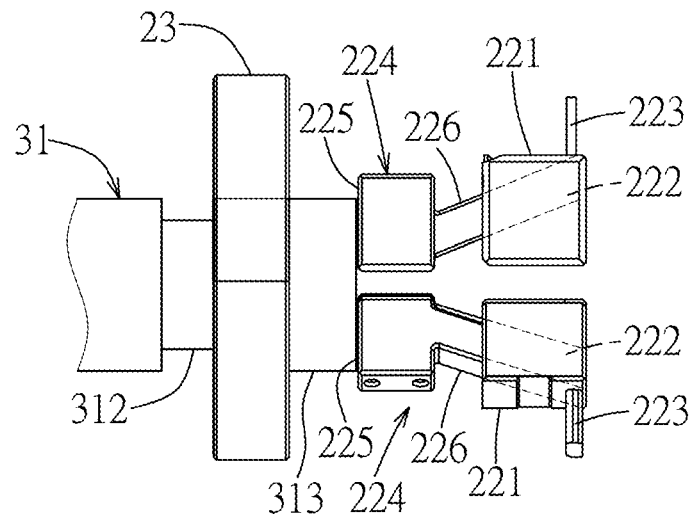
FIG. 8 is a fragmentary schematic side view, illustrating a plurality of slide members in a first position.
Figure 9:
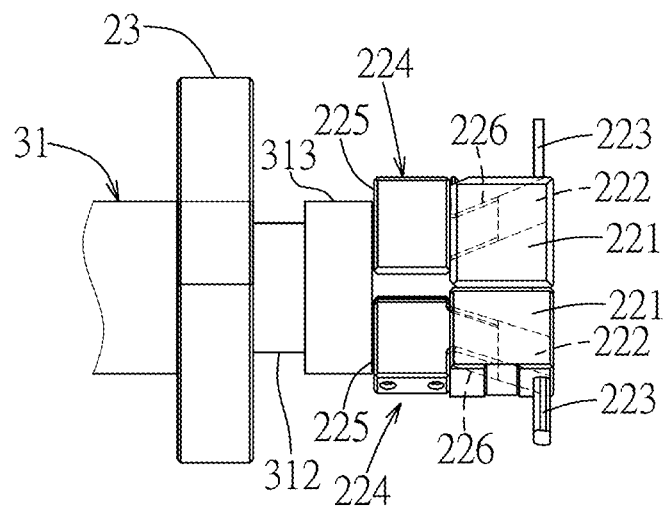
FIG. 9 is a view similar to FIG. 8, but illustrating the slide members in a second position.

With reference to FIGS. 8 and 9, the slide members 221 are movable between a first position (see FIG. 8) and a second position (see FIG. 9). In the first position, the pushing portion 313 of the push rod 31 abuts against the drive members 224 of the positioning pin units 22, the slide members 221 of the positioning pin units 22 are spaced apart from each other, and the positioning pins 223 of the positioning pin units 22 extend into the first mold cavity 252 (see FIG. 13). When the push rod 31 is actuated by the pushing device (not shown), the push rod 31 pushes the drive members 224 to engage the respective slide members 221 by inserting the inclined insert portions 226 of the drive members 224 into the respective through holes 222 of the slide members 221 and drive the respective slide members 221 to move toward each other and into an internal portion of the male mold core 2, thereby retracting the positioning pins 223 from the first mold cavity 252 and shifting the slide members 221 from the first position to the second position. The slide members 221 can be moved back from the second position to the first position by inserting a tool (not shown) into one of the holes in the forming member 25.

Figure 10:
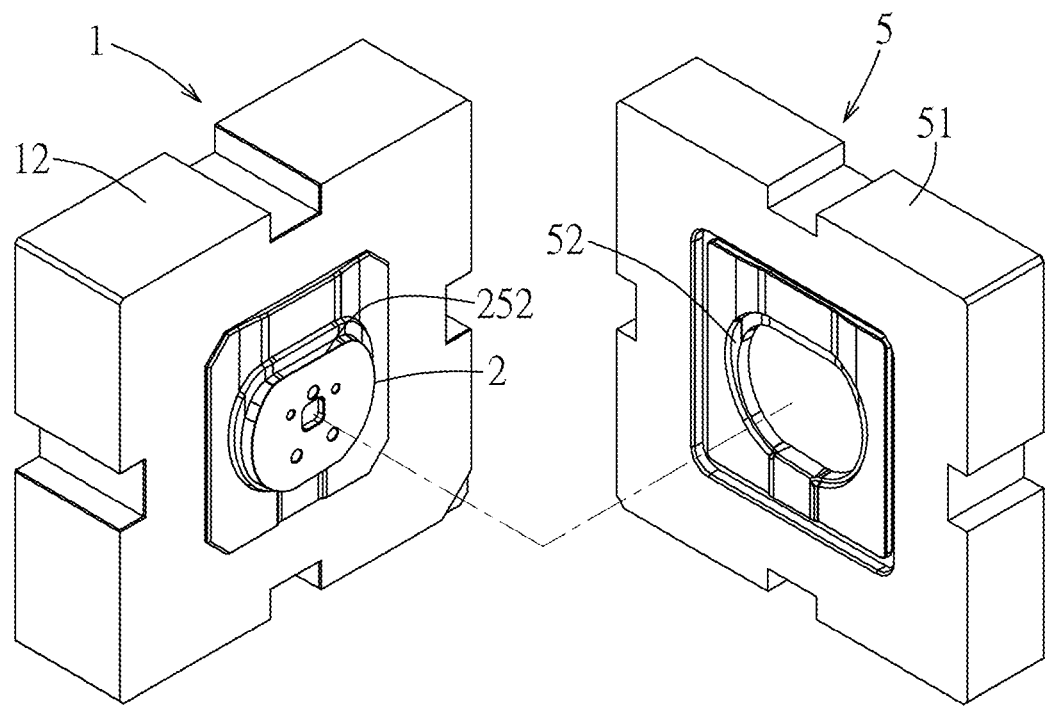
FIG. 10 is an exploded perspective view of the male mold and a female mold core.
Figure 11:
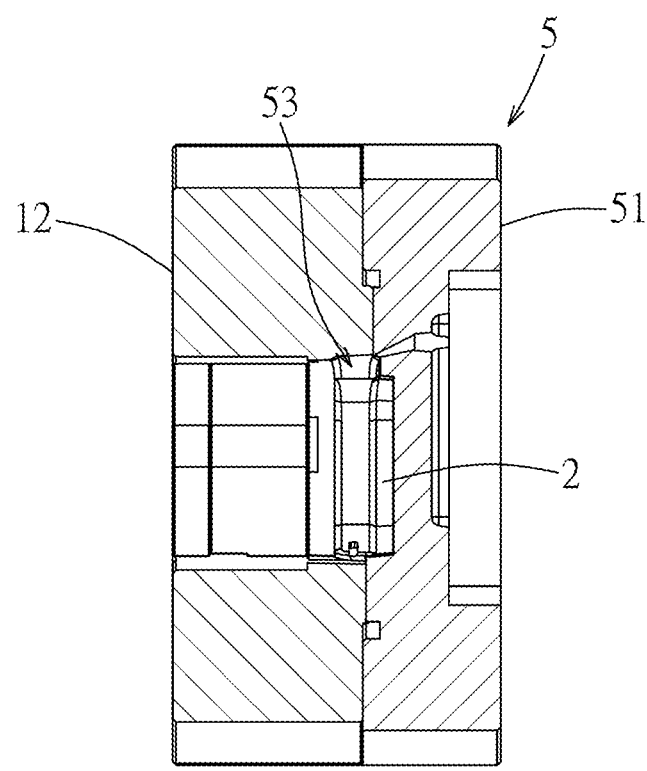
FIG. 11 is a sectional view, illustrating the male mold and the female mold being mated to form a complete mold cavity.

Referring to FIGS. 10 and 11, in combination with FIGS. 2 to 5, the female mold core 5 is disposed on the female mold 4, and includes a main body 51, and a second mold cavity 52 formed in the main body 51. The first and second mold cavities 252, 52 form a complete mold cavity 53 when the male and female molds 1, 4 are mated.

Figure 4:
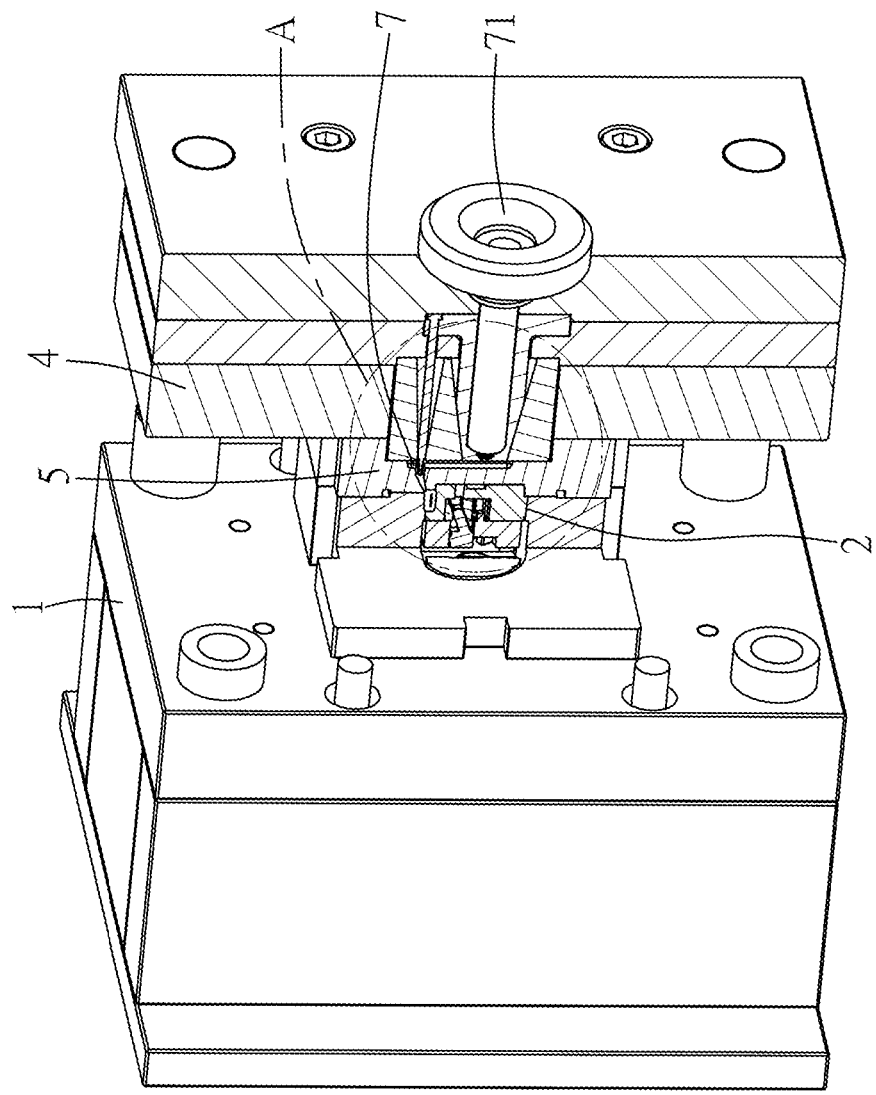
FIG. 4 is a partial sectional view of the first embodiment in an assembled state.
Figure 5:
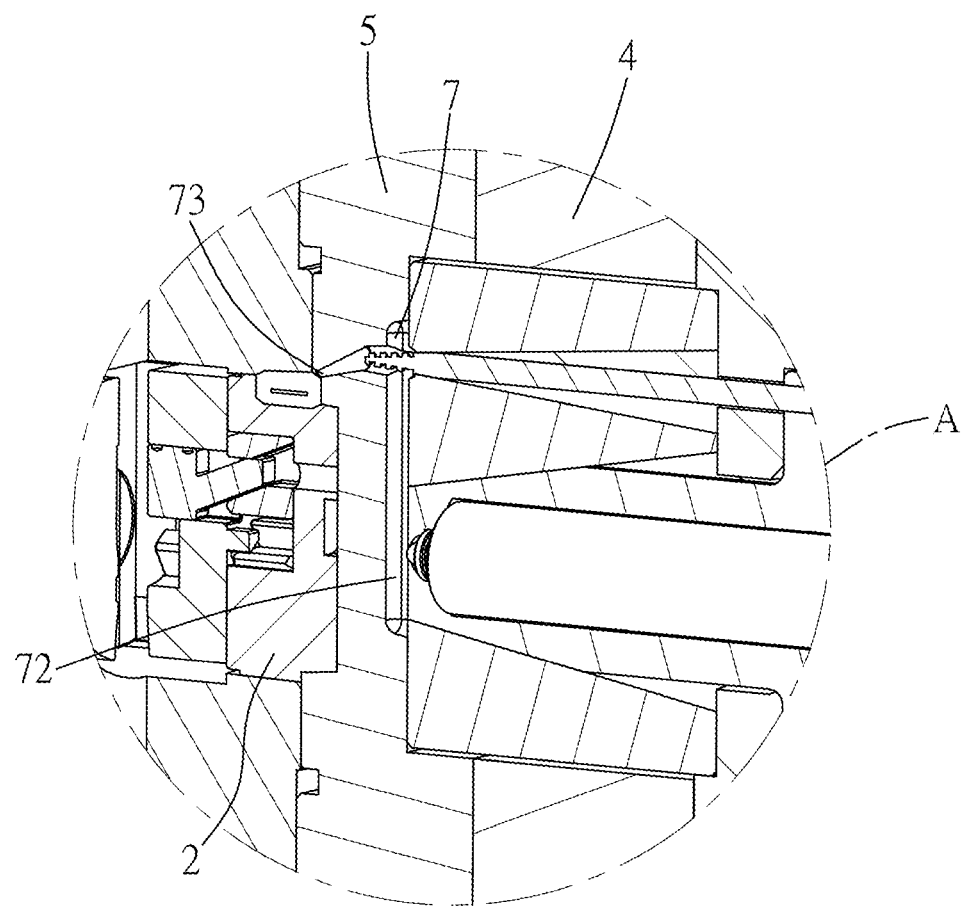
FIG. 5 is an enlarged sectional view of the first embodiment taken along an encircled portion (A) of FIG. 4.

Referring to FIGS. 4 and 5, the runner system 7 includes a gate 71 provided in the female mold 4 distal from the male mold 1, a runner 72 extending through the female mold 4 and the female mold core 5 and communicating with the gate 71, and a sprue 73 that communicates with the runner 72 and the second mold cavity 52. It should be noted that the number of the runner 72 may be varied according to the requirement, and is not limited to the aforesaid disclosure.

Figure 12:
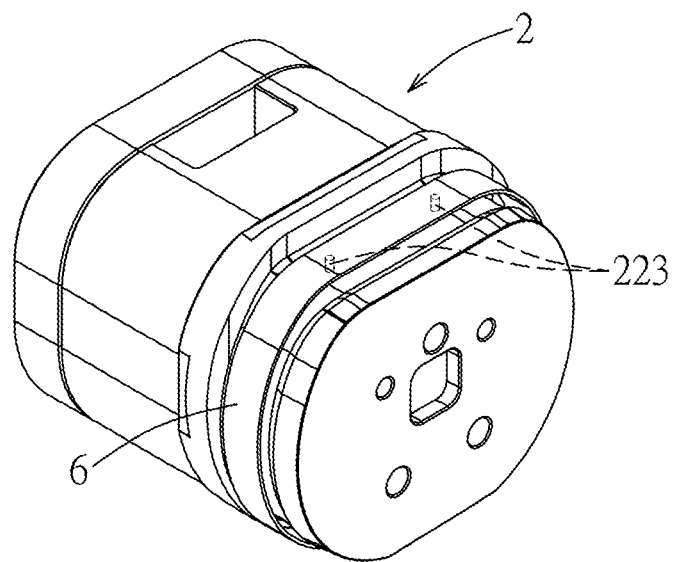
FIG. 12 is a perspective view, illustrating the core piece being disposed on the male mold core.
Figure 13:
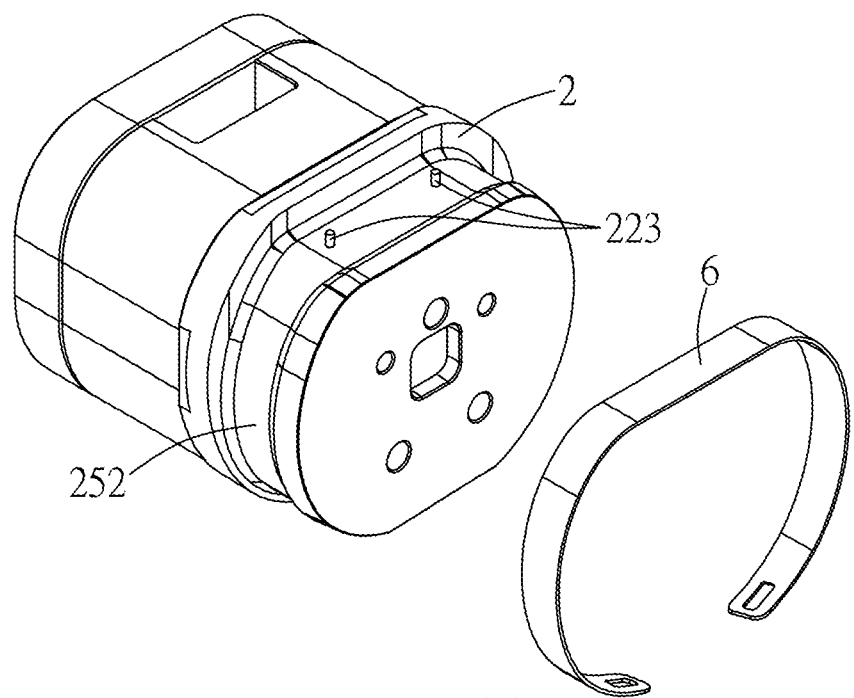
FIG. 13 is an exploded perspective view of the core piece and the male mold core.
Figure 14:
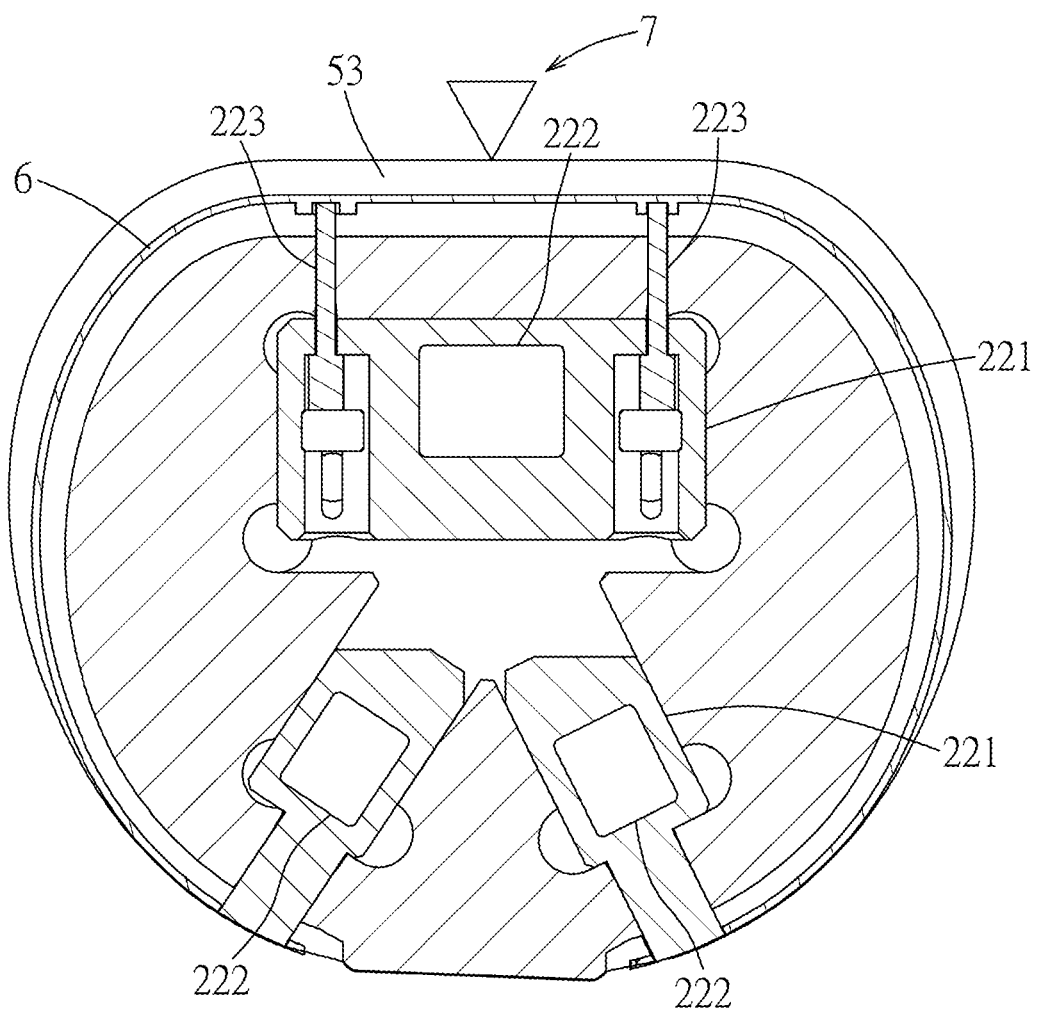
FIG. 14 is a schematic sectional view, illustrating the core piece being located in the mold cavity.
Figure 15:
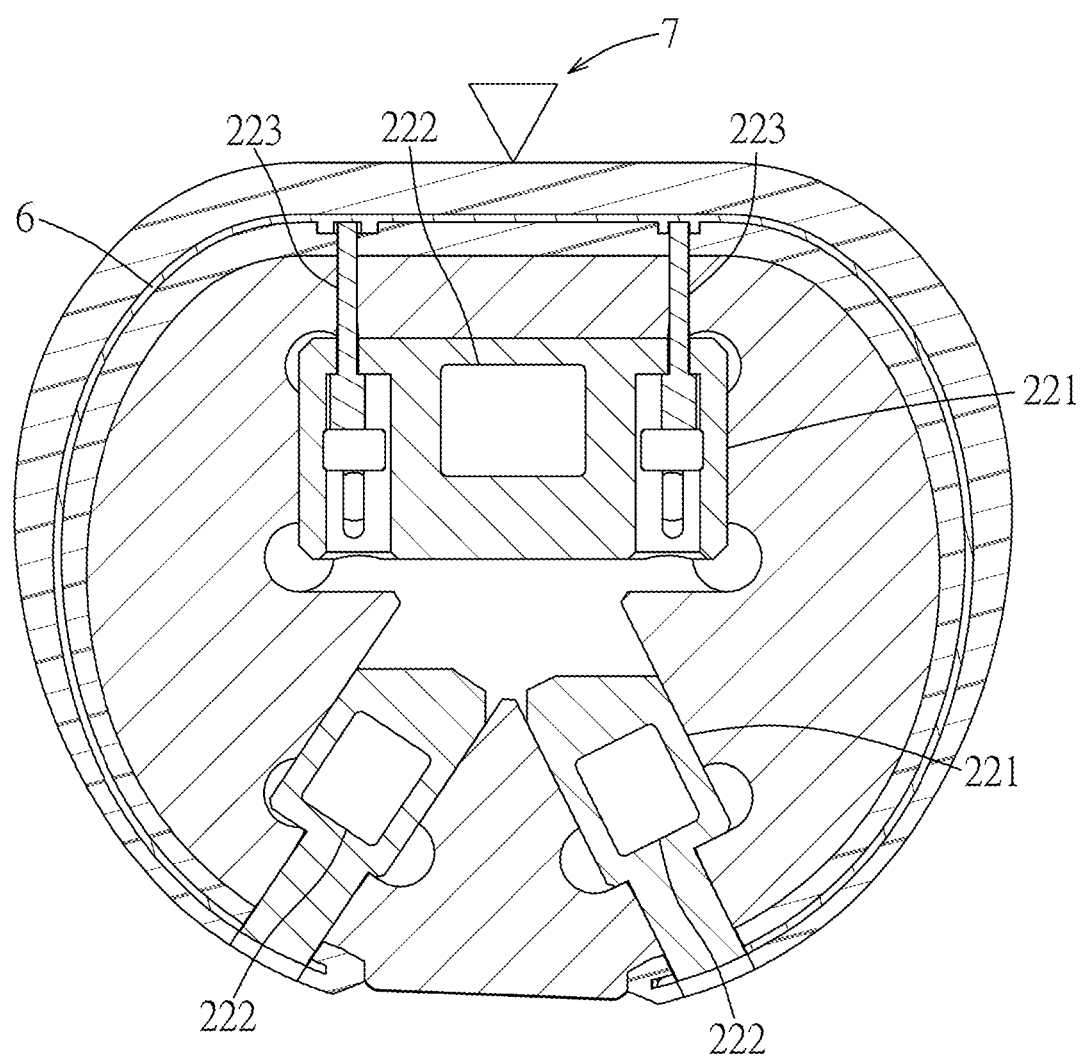
FIG. 15 is a view similar to FIG. 14, but illustrating the mold cavity being filled with a molten plastic material to surround the core piece and the positioning pins being located in a non-retracted position.
Figure 16:
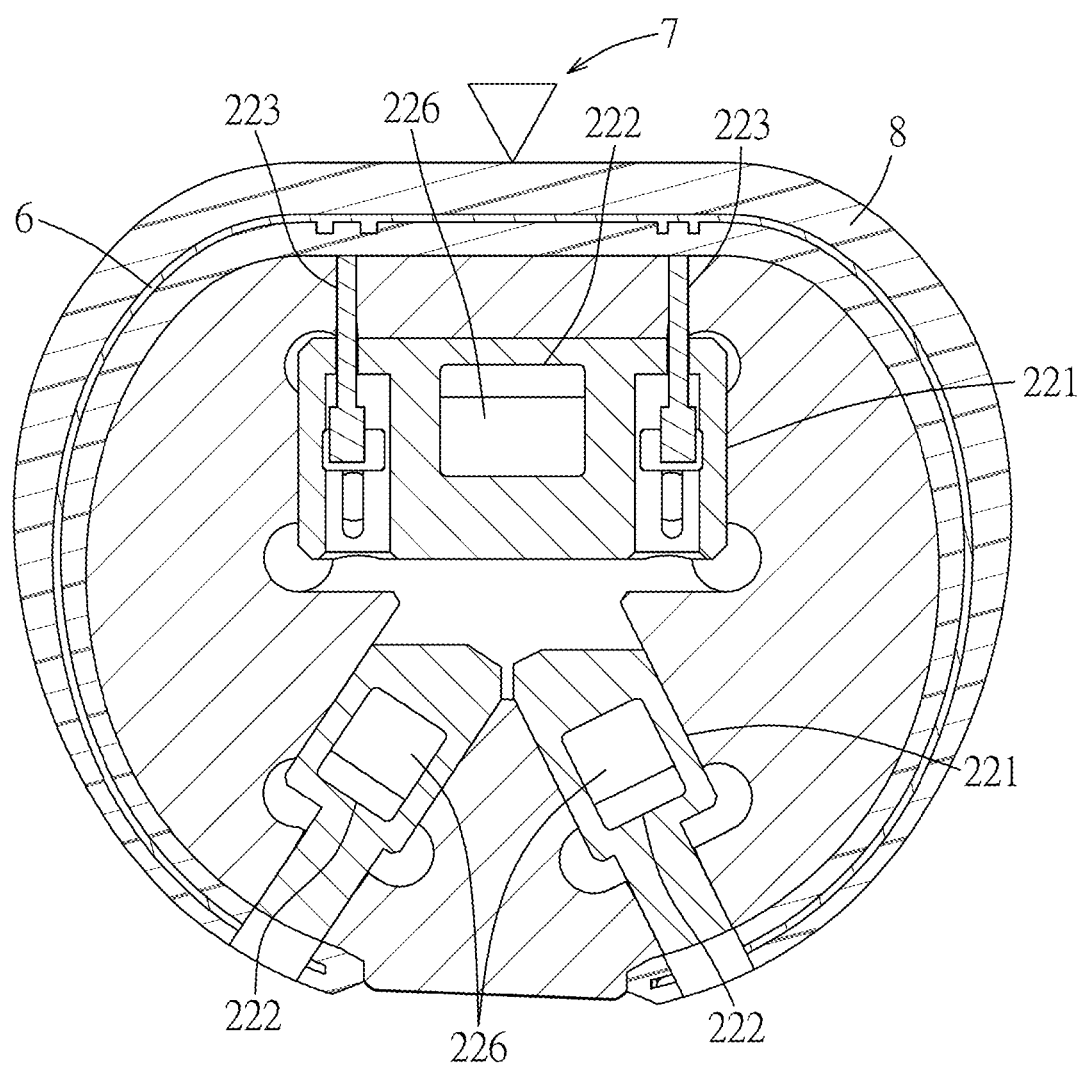
FIG. 16 is a view similar to FIG. 15, but illustrating the positioning pins being retracted from the mold cavity.
Figure 17:
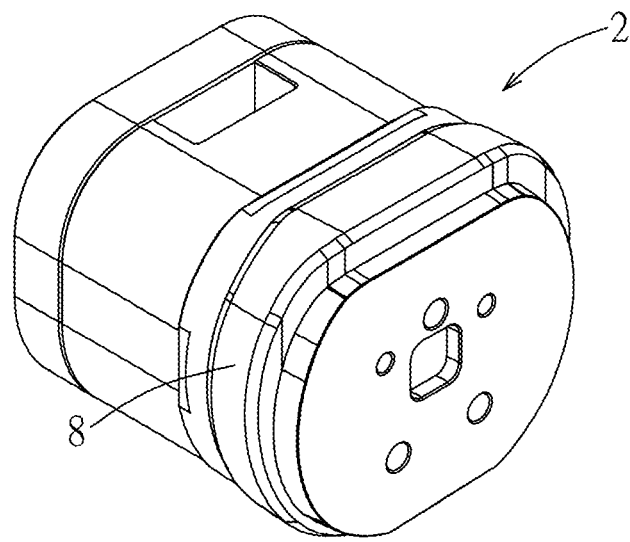
FIG. 17 is a perspective view, illustrating a finished product being located on the male mold core.

Referring to FIGS. 12 and 13, in combination with FIG. 10, during the implementation of the aforementioned method of this embodiment, the core piece 6, in the form of a ring with a notch, is disposed on the mold cavity 252 of the male mold core 2, and when the slide members 221 are disposed in the first position, as shown in FIG. 8, the positioning pins 223 extend into the first mold cavity 252 to position the core piece 6. Then, the male and female molds 1, 4 are mated so that the first and second mold cavities 252, 52 cooperatively form a complete mold cavity 53, and the core piece 6 is positioned in the mold cavity 53. In this embodiment, the core piece 6 is made of a metal material.

Referring to FIGS. 14 to 18, the molten plastic material is injected into the mold cavity 53 through the runner system 7. The pressure inside the mold cavity 53 is maintained at a predetermined maintaining time after the mold cavity 53 is filled with the molten plastic material. Then, the push rod 31 is pushed by the pushing device (not shown) to move the slide members 221 to the second position (see FIG. 9) so as to retract the positioning pins 223 from the first mold cavity 252. A finished product 8 is formed after the molten plastic material is cured completely, and can be directly removed from the male mold core 2.

Figure 19:
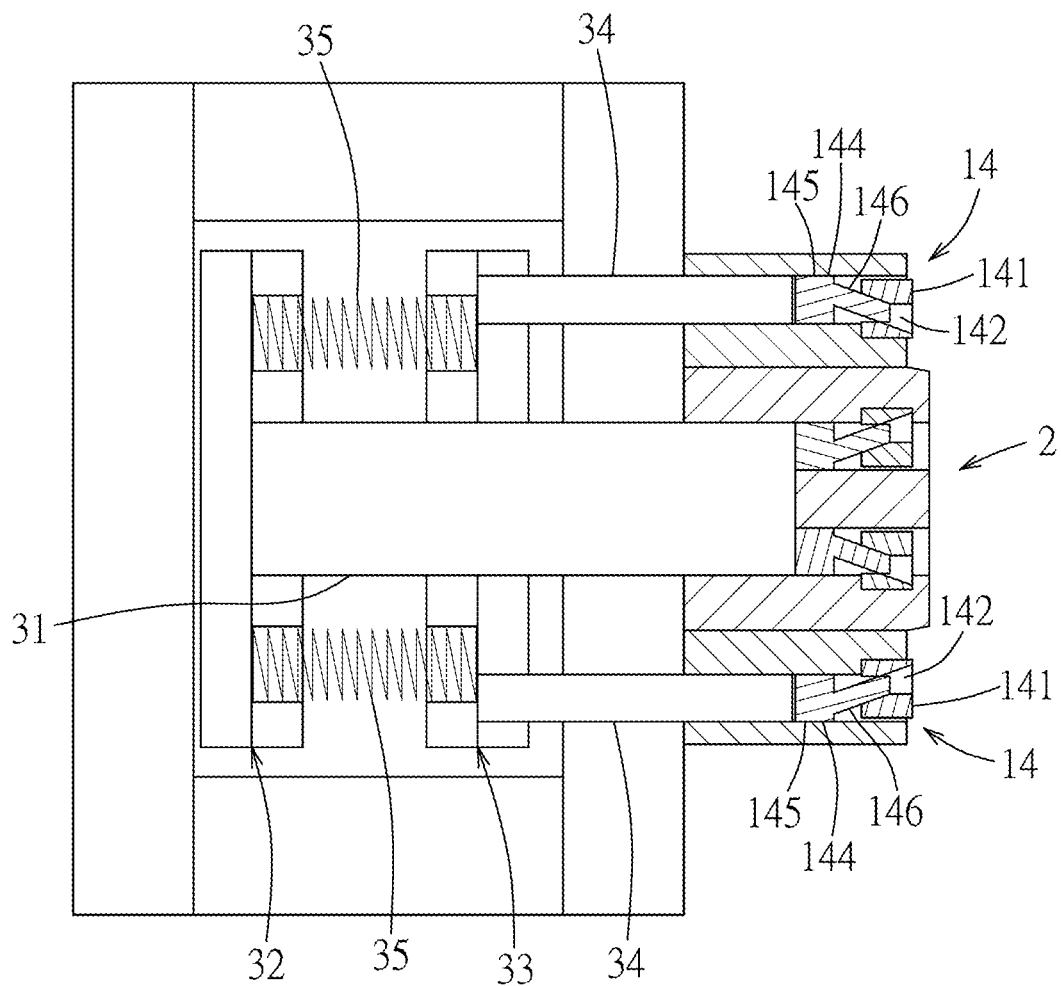
FIG. 19 is a partial sectional side view, illustrating a male mold and a pushing system of a second embodiment of an injection mold mechanism of the disclosure.
Figure 20:
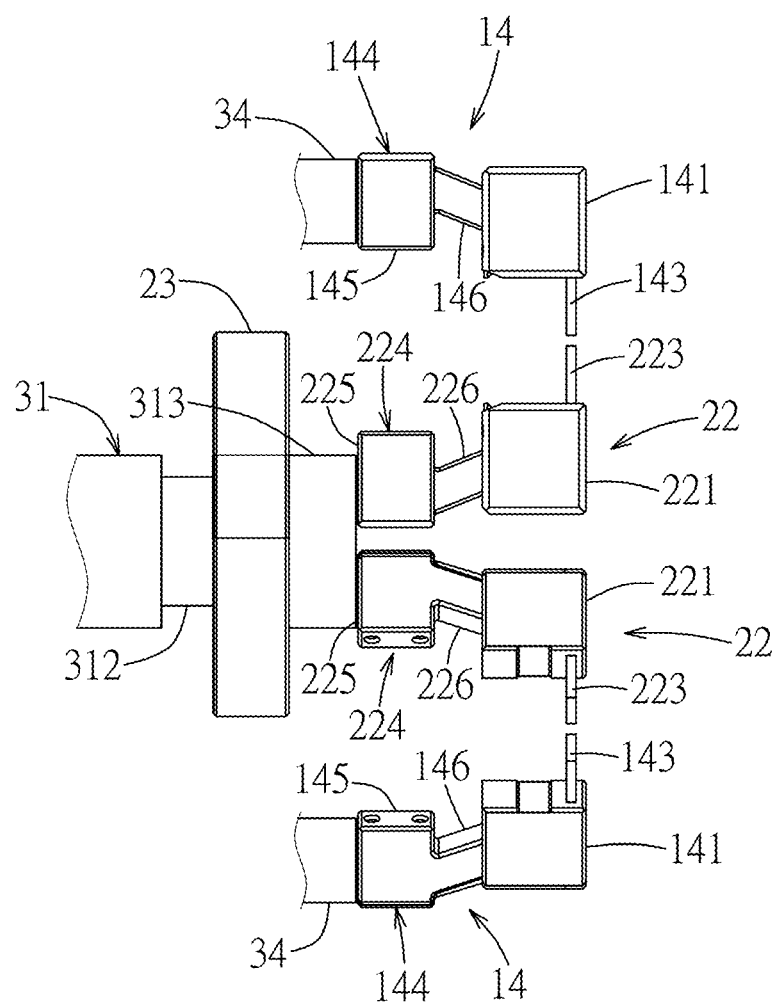
FIG. 20 is fragmentary schematic side view, illustrating a plurality of slide members and a plurality of outer slide members of the second embodiment in a first position.
Figure 21:
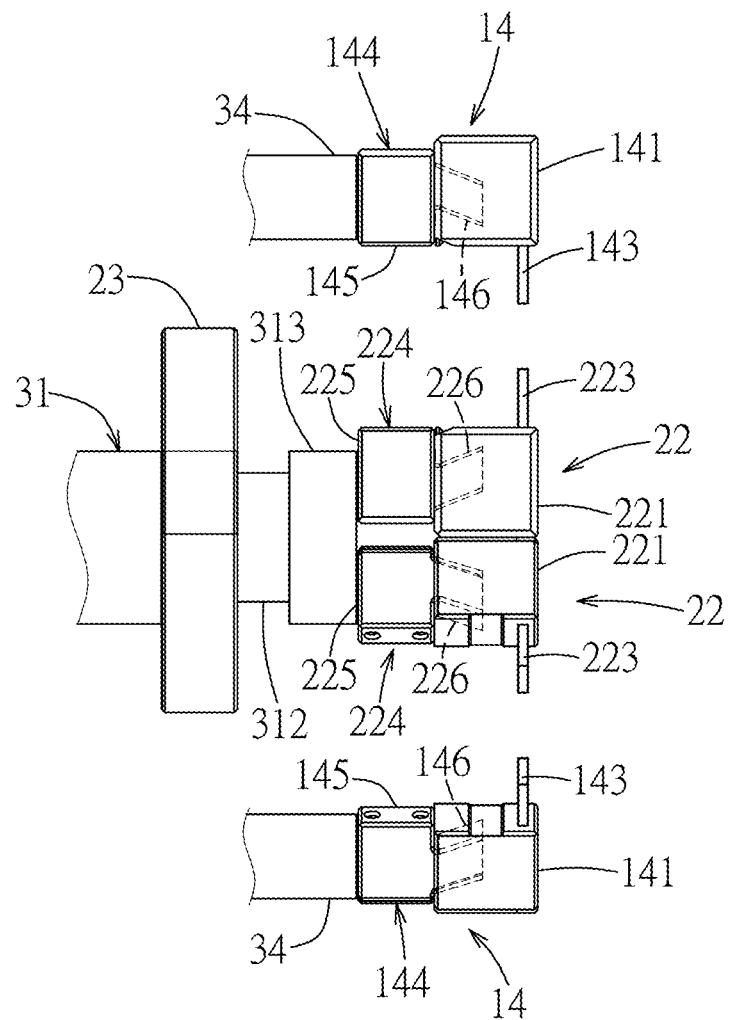
FIG. 21 is a view similar to FIG. 20, but illustrating the slide members and the outer slide members of the second embodiment in a second position.

Referring to FIGS. 19 to 21, a second embodiment of an injection mold mechanism of the disclosure is shown to have components similar to those of the first embodiment. However, in the second embodiment, the male mold 1 further includes three outer positioning pin units 14, and the pushing system 3 further includes a first push plate 32 connected to the push rod 31, two spaced-apart springs 35 that are disposed on the first push plate 32 and that extend toward the male mold core 2, a second push plate 33 that is connected to the springs 35 opposite to the first push plate 32 and that is parallel to the first push plate 32, and three outer push rods 34 (only two are shown in FIGS. 19 to 21) that are connected to the second push plate 33 and that extend through the male mold 1. Each of the outer positioning pin units 14 has an outer slide member 141 with a through hole 142, an outer positioning pin 143 fixed on the outer slide member 141, and an outer drive member 144 to drive movement of the outer slide member 141. The outer drive member 144 has an outer abutment portion 145 abutting against the outer push rod 34, and an inclined insert portion 146 that is inclined with respect to the abutment portion 145 and that is movable into the through hole 142.

With reference to FIGS. 19 to 21, the outer positioning pin units 14 are actuated in the same manner as the positioning pin units 22. When the first push plate 32 is actuated by the pushing device (not shown), the first push plate 32 pushes the push rod 31 and compresses the springs 35 to in turn push the second push plate 33 so as to move the outer push rods 34 toward the male mold core 2, thereby simultaneously pushing the inclined insert portions 226 of the drive members 224 into the through holes 222 of the slide members 221 and the inclined insert portions 146 of the outer drive members 144 into the through holes 142 of the outer slide members 141. As such, the slide members 221 are driven to move toward the internal portion of the male mold core 2 and the outer slide members 141 are driven to move in a direction opposite to that of the slide members 221, thereby retracting the positioning pins 223 and the outer positioning pins 143 from the mold cavity (not shown). That is, in the second embodiment, the core piece (not shown) may be fixed cooperatively by the positioning pins 223 which are located inside the male mold core 2 and the outer positioning pins 143 which are located outside the male mold core 2, and the positioning pins 223 and the outer positioning pins 143 may be retracted simultaneously from the mold cavity.

To sum up, by maintaining the pressure inside the mold cavity 53 at a predetermined maintaining time after the mold cavity is filled with the molten plastic material so that the core piece 6 is positioned by the molten plastic material, and followed up by retracting the positioning pins 223 from the mold cavity 53, the core piece 6 can be positioned more accurately in a preset position in the finished product 8. Therefore, the effect of the disclosure can be achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. An injection mold mechanism comprising:
   a male mold including a base plate, and an embedding portion disposed on said base plate and formed with an embedding groove;
   a pushing system including a push rod that is actuatable to move through said male mold along a pushing direction; and
   a male mold core disposed in said embedding groove and including
      a forming member having a first mold cavity,
      a positioning module including a plurality of positioning pin units each of which has a slide member, at least one positioning pin fixed on said slide member, and a drive member to drive movement of said slide member, and
      a connecting member having an engaging groove, and a holding member sandwiched between said forming member and said connecting member, said push rod extending movably through said engaging groove, said forming member further having a plurality of slide grooves respectively receiving said slide members of said positioning pin units, said first mold cavity being formed on an outer periphery of said forming member, said holding member having a plurality of first receiving holes respectively receiving said drive members of said positioning pin units, and a second receiving hole communicating with said first receiving holes for receiving said push rod;
   wherein, prior to actuation of said push rod, said slide members of said positioning pin units are spaced apart from each other and said positioning pins of said positioning pin units extend into said first mold cavity; and
   wherein, when said push rod is actuated, said push rod pushes said drive members of said positioning pin units to respectively engage said slide members and drive said slide members to move toward each other to thereby retract said positioning pins from said first mold cavity.

2. The injection mold mechanism as claimed in claim 1, wherein said slide member of each of said positioning pin units has a through hole, said drive member of each of said positioning pin units having an abutment portion abutting against said push rod, and an inclined insert portion that is inclined with respect to said abutment portion and that is movable into said through hole.

3. The injection mold mechanism as claimed in claim 1, wherein said push rod has a main body, a neck portion connected to said main body, and a pushing portion connected to said neck portion opposite to said main body, said engaging groove of said connecting member having an inverted U-shaped cross section with an opening that opens downward, said neck portion having a cross-sectional area smaller than that of said main body and that of said pushing portion, and being inserted movably into said engaging groove through said opening, said pushing portion extending into said second receiving hole of said holding member and having a shape matching that of said second receiving hole.

4. The injection mold mechanism as claimed in claim 3, further comprising a female mold, and a female mold core disposed on said female mold and the female mold core including a main body, and a second mold cavity formed in said main body of said female mold core, said first and second mold cavities forming a complete mold cavity when said male and female molds are mated.

5. The injection mold mechanism as claimed in claim 4, further comprising a runner system located in said female mold and communicating with said second mold cavity.

6. The injection mold mechanism as claimed in claim 5, wherein said runner system includes a gate provided in said female mold distal from said male mold, at least one runner extending through said female mold and said female mold core and communicating with said gate, and a sprue that corresponds in number to said runner and that communicates with said second mold cavity.

7. An injection mold mechanism comprising:
   a male mold core including,
      a forming member having a first mold cavity, and
      a positioning module including a plurality of inner positioning pin units each of which has an inner slide member, at least one inner positioning pin fixed on said inner slide member, and an inner drive member to drive movement of said inner slide member;
   a male mold including a base plate, and an embedding portion disposed on said base plate, and a plurality of outer positioning pin units, said embedding portion being formed with an embedding groove in a surface that is opposite to an interface between said embedding portion and said base plate for receiving said male mold core, each of said outer positioning pin units having an outer slide member with a through hole, an outer positioning pin fixed on said outer slide member, and an outer drive member to drive movement of said outer slide member, said outer drive member having an outer abutment portion and an inclined insert portion that is inclined with respect to said outer abutment portion and that is movable into said through hole in said outer slide member; and a pushing system including an inner push rod that is actuatable to move through said male mold along a pushing direction, a first push plate connected to said inner push rod, a plurality of springs that are disposed on said first push plate and that extend toward said male mold core, a second push plate that is connected to said springs opposite to said first push plate and that is parallel to said first push plate, and a plurality of outer push rods that are connected to said second push plate and that extend through said male mold, said inner push rod abutting against said inner drive member, each of said outer push rods abutting against said outer drive member of a respective one of said outer positioning pin units;

wherein, prior to actuation of said inner and outer push rods, said inner slide members of said inner positioning pin units are spaced apart from each other, said outer slide members of said outer positioning pin units are also spaced apart from each other, and said inner positioning pins of said inner positioning pin units and said outer positioning pins of said outer positioning pin units extend into said first mold cavity;

wherein, when said inner push rod is actuated, said inner push rod pushes said inner drive members of said inner positioning pin units to respectively engage said inner slide members and drive said inner slide members to move toward each other to thereby retract said inner positioning pins from said first mold cavity; and wherein, when said outer push rods are actuated, said outer push rod pushes said outer drive members of said outer positioning pin units to respectively engage said outer slide members and drive said outer slide members to move toward each other to thereby retract said outer positioning pins from said first mold cavity.

8. The injection mold mechanism as claimed in claim 7, wherein said male mold core further includes a connecting member having an engaging groove, and a holding member sandwiched between said forming member and said connecting member, said inner push rod extending movably through said engaging groove, said forming member further having a plurality of slide grooves respectively receiving said inner slide members of said inner positioning pin units, said first mold cavity being formed on an outer periphery of said forming member, said holding member having a plurality of first receiving holes respectively receiving said inner drive members of said inner positioning pin units, and a second receiving hole communicating with said first receiving holes for receiving said inner push rod.

9. The injection mold mechanism as claimed in claim 8, wherein said inner slide member of each of said inner positioning pin units has a through hole, said inner drive member of each of said inner positioning pin units having an abutment portion abutting against said inner push rod, and an inclined insert portion that is inclined with respect to said abutment portion of said inner drive member and that is movable into said through hole in said inner slide member.

10. The injection mold mechanism as claimed in claim 8, wherein said inner push rod has a main body, a neck portion connected to said main body, and a pushing portion connected to said neck portion opposite to said main body, said engaging groove of said connecting member having an inverted U-shaped cross section with an opening that opens downward, said neck portion having a cross-sectional area smaller than that of said main body and that of said pushing portion, and being inserted movably into said engaging groove through said opening, said pushing portion extending into said second receiving hole of said holding member and having a shape matching that of said second receiving hole.

11. The injection mold mechanism as claimed in claim 10, further comprising a female mold, and a female mold core disposed on said female mold and the female mold core including a main body, and a second mold cavity formed in said main body of said female mold core, said first and second mold cavities forming a complete mold cavity when said male and female molds are mated.

12. The injection mold mechanism as claimed in claim 11, further comprising a runner system located in said female mold and communicating with said second mold cavity.

13. The injection mold mechanism as claimed in claim 12, wherein said runner system includes a gate provided in said female mold distal from said male mold, at least one runner extending through said female mold and said female mold core and communicating with said gate, and a sprue that corresponds in number to said runner and that communicates with said second mold cavity.

* * * * *